United States Patent [19]
Grisebach

[11] 3,952,365
[45] Apr. 27, 1976

[54] DAMPING DEVICE FOR HINGES AND THE LIKE

[76] Inventor: Hans-Theodor Grisebach, Kampstrasse 7, 475 Unna, Germany

[22] Filed: Jan. 21, 1975

[21] Appl. No.: 542,805

Related U.S. Application Data

[63] Continuation-in-part of Ser. No. 345,304, March 27, 1973, abandoned.

[30] Foreign Application Priority Data
Mar. 27, 1972 Germany............................ 2214965

[52] U.S. Cl........................................ 16/52; 16/82; 16/85
[51] Int. Cl.²............................................ E05F 3/10
[58] Field of Search.............. 16/49, 54, 50, 51, 52, 16/71, 72, 75, 76, 77, 82, 85, 137

[56] References Cited
UNITED STATES PATENTS

| | | |
|---|---|---|
| 1,823,263 | 9/1931 | Fabry...................................... 16/54 |
| 1,904,207 | 4/1933 | Donadea................................. 16/54 |
| 2,118,950 | 5/1938 | Stannard................................. 16/54 |
| 2,434,524 | 1/1948 | Swanson ................................. 16/54 |
| 3,118,167 | 1/1964 | Morris et al. ........................ 16/54 X |
| 3,648,326 | 3/1972 | Gaysowski ............................ 16/48.5 |
| 3,860,993 | 1/1975 | Matuska ................................. 16/52 |

FOREIGN PATENTS OR APPLICATIONS
748,658   7/1933   France..................................... 16/54

*Primary Examiner*—G. V. Larkin
*Attorney, Agent, or Firm*—William C. Linton

[57] ABSTRACT

A device includes a spring for biasing a door or other similar structure into a closed position and a fluid medium for damping movement of the door. The damping effect is achieved by compelling the fluid to pass from one chamber to another within a housing of the device by changing the volumes of the chambers, the spring itself being used to bring about the change in volume.

11 Claims, 18 Drawing Figures

DAMPING DEVICE FOR HINGES AND THE LIKE

CROSS-REFERENCE TO RELATED APPLICATION

This application is a continuation in part of application Ser. No. 345,304 filed Mar. 27, 1973, now abandoned.

BACKGROUND OF THE INVENTION

Devices are well known which include a spring for biasing a door, hinged flap or the like, into a closed position, and at the same time make use of a viscous fluid to damp movement of the door. The dampening effect may be achieved by using the fluid to resist frictionally the movement of components within the device, or alternatively by causing the fluid to pass from one chamber to another through a restricted opening as the volumes of the chambers are varied, see for example U.S. Pat. No. 3,648,326 issued to Joseph J. Gaysowski, Mar. 14, 1972 and entitled "ELECTROMECHANICAL DOOR HOLDER CLOSER".

The known devices have generally been large in size because of the need to provide space for the fluid chambers and for the spring. Gaysowski, for instance, teaches a large external spring.

The present invention has for its object the provision of a device which can be given compact proportions and may form part of the hinge itself.

SUMMARY OF THE INVENTION

The present invention is based on the discovery that a substantial saving in space may be made by using the changes in shape of the spring itself to vary the volumes of the chambers between which the fluid is passed. The spring therefore serves two functions, firstly that of biasing the door into its closed position and secondly that of defining, or coacting with a part which defines the chambers in question. In the extreme case, therefore, the device may consist simply of a housing connected to one door leaf and a spring which is contained within the housing and is connected to the other door leaf. The spring cooperates with the housing to define two chambers as well as a restricted port interconnecting the chambers. Relative rotation of the two hinge parts distorts the spring and variations in the volumes of the chambers take place and result in the expulsion of fluid from one chamber to another. The fundamentally opposite arrangement may be employed, in which the housing forms a tubular torsion spring which is so shaped that variations in volume within the housing take place as the hinge parts perform a relative rotating movement.

Other more complex arrangements are possible as will become apparent from the detailed description which follows.

DESCRIPTION OF PREFERRED EMBODIMENTS

Figure 1:
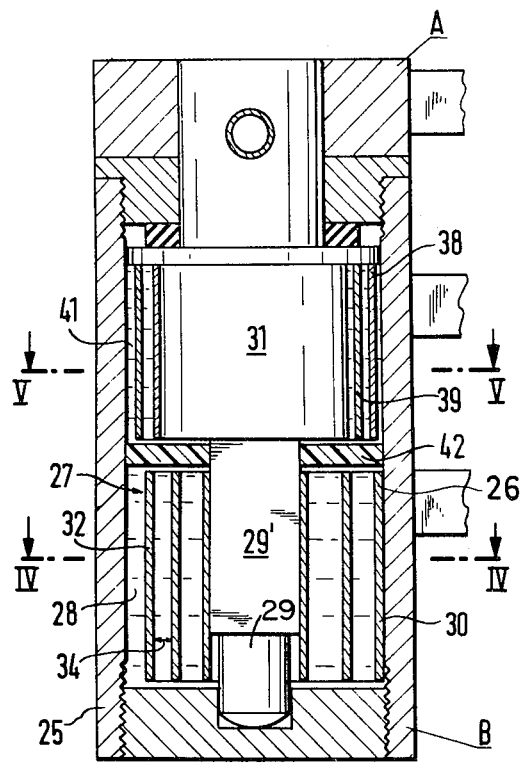
FIG. 1 shows a longitudinal section taken on line I—I in FIG. 2 through a hinge with a spiral leaf spring drive and with an additional eccentric drive, and also with hydraulic braking.
Figure 3:
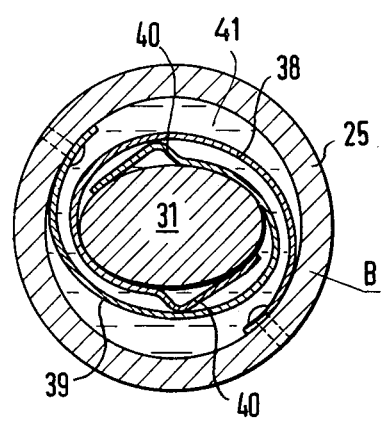
FIG. 3 shows a section along the line V—V of FIG. 1.
Figure 2:
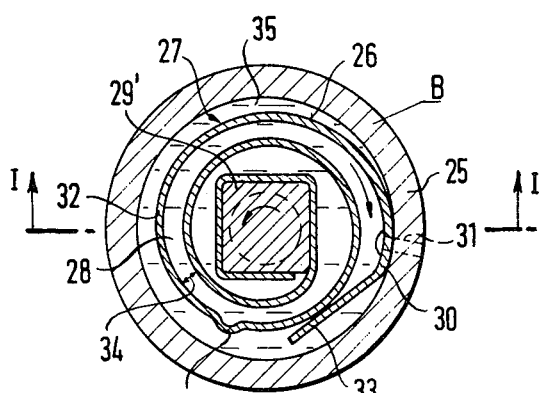
FIG. 2 is a cross section along the line IV—IV of FIG. 1.

Referring to FIGS. 1 to 3, a door closing device comprises a top part A and a bottom part B. One of these parts is attached in use to the door and the other part to a door frame or other stationary element. The part B has a cylindrical housing 25 which defines a chamber in which a sprial spring 27 is immersed in rheopectic working fluid 28. The spring is formed from a coil of relatively wide steel strip and has its side edges 26 substantially in contact with the end walls of the spring chamber. One of these end walls is constituted by a screwed-in end plug and the other by a partition 42.

The hinge part A constitutes a cap for the part B and has fixed to it a shaft 29 which projects into the part B and has a portion 29' of square cross-section onto which the innermost turn of the spring 27 is wound, and a cylindrical stub rotatably received in a socket in the end plug.

The spring 27 is anchored to the wall of the housing by a pin 31 at a point spaced from the actual end of the spring so that an end portion of the spring is left free and forms a flap valve 33 which is prestressed inwardly into contact with the adjacent turn 32. Rotation of the shaft 29 in the direction shown by the arrow results in the spiral spring 27 being tensioned. Simultaneously, the gap which is formed between the turns of the spiral spring 27 and constitutes a first working chamber 34 is reduced in size. The working fluid 28 enclosed in this gap is displaced in the direction shown by the arrow into a second working chamber 35 defined between the turn 32 and the housing wall. This displacement is possible without resistance and is accompanied by the lifting of the valve flap 33. Rotation of the shaft 29 in the opposite direction results in a relaxation of the spring, an enlargement of the gap or chamber 34, and a return flow of working fluid. This return flow is resisted by the valve flap 33, so that the working fluid 28 passes slowly from the second working chamber to the first via the restricted or throttled gap or orifice provided between the axial end of the spring and the housing. Protuberances 36 or the like formed in the turn 32 keep the valve flap 33 wholly or partly at a predetermined distance from this turn 27 when the spring has been tightened to rotate the protuberances into contact with the valve flap 33, so that the speed of relative rotation between the main hinge parts A and B can be selected in advance.

FIG. 3 shows a cross section taken on the line V—V of FIG. 1. At this location, the shaft 29 connected with the main hinge part A is widened to form a part 31 of elliptical cross-section which is embraced by two leaf spring elements 38 and 39 which may have any suitable curvature ranging from a simple V or U shape to a more complex spiral configuration. Each of the spring elements is deformed to provide a detent cavity 40 such that when the two hinge parts pivot relative to each other through an angle of about 90° from the closed position (which is offset by a certain angle from the position shown in the diagram) the smaller diameter ends of the widened part 31 enter the cavities 40 to provide a latching action. Further pivoting movement gives rise to a negative force on the shaft. In view of the considerable change of shape that they must undergo, the leaf spring elements 38 and 39 are very thin but have a correspondingly greater width. The partition 42 is preferably in the form of a compressible disc. The overall effect is that during relative rotation of the two hinge parts, the shaft will turn through an angle of about 90° during which time the prestressing of the leaf spring elements 38 and 39 and of the spiral spring 27 is overcome. During this stage the prestressing of the spring elements 38 and 39 decreases to zero, a negative force being applied when the shaft has turned beyond an angle of 90°. As a result the maximum closing force is applied at the beginning of the opening movement of a door or flap and the minimum at the beginning of the closing movement.

Figure 4:
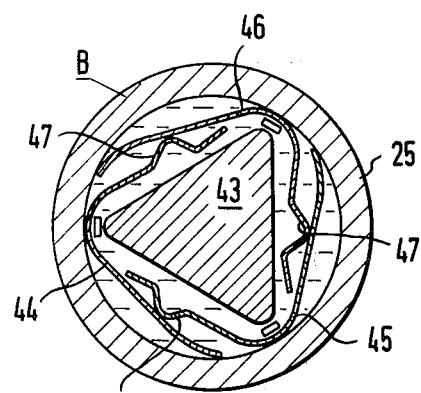
FIG. 4 shows an eccentric drive with a catch and with V-shaped plate springs arranged to form a triangle.

FIG. 4 shows a modification of the spring arrangement just described. In this modification the shaft has a widened part 43 of triangular cross-section which is embraced by three interleaved leaf spring elements 44, 45 and 46, bent into V-shaped. The leaf spring elements 44, 45 and 46 may be disposed in the housing 25 in staggered positions in relation to one another such that one branch of each such element overlaps the next. That branch of each leaf spring element which is proximate to the shaft portion 43 is deformed to have a detent cavity 47 which engages a vertex of the triangular shaft portion 43 when the door has been opened to a certain angle, e.g. 60°. This construction is particularly suitable for automobile doors for example, in which a latching effect at a particular opened position is desired.

Figure 5:
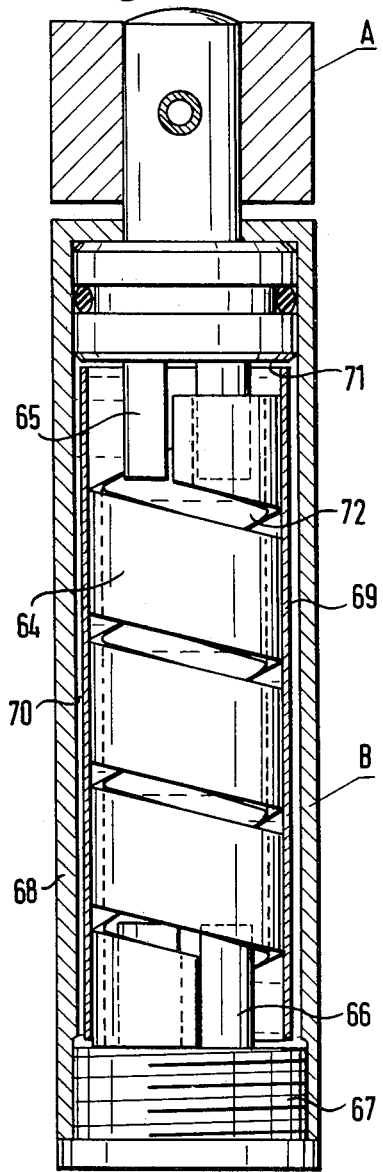
FIG. 5 is a longitudinal section through a hinge with a helical spring drive, the damping being provided by deformation of the helical springs.

The invention may be performed using a helical spring, as shown in FIG. 5. In the embodiment in question, a helical leaf spring 64 is enclosed by a cylindrical housing 68 forming part of one hinge body B, the end of the spring being locked in place to lugs 66 which project from a plug 67 screwed into the housing 68. The other end of the spring is similarly connected by lugs 65 to the other hinge body A. The spring is embraced by a sleeve 69 which is slit longitudinally and has one edge of the sleeve overlapping the other. When the hinge part A is rotated in relation to the hinge part B in the door opening direction, the diameter of the helical spring 64 becomes reduced, as does the diameter of the clamping sleeve 69 as the result of prestressing of the sleeve. The contraction of the sleeve is facilitated by the opening of an aperture between the two longitudinal edges of the sleeve, with the result that the fluid in chamber 72 within the spring flows into an outer chamber 70. Once the force effecting rotation has ceased, the force component of the spiral spring 64 tending to restore the spring to its original condition and directed radially outwardly acts on the working fluid contained in the chamber 70. The slit sleeve operates as a non-return valve and prevents the fluid entering the sleeve by the route along which it left. The fluid is therefore forced to flow back from the outer chamber 70 into the central chamber 72 through gaps at the end of the sleeve.

This basic principle may also be applied to a construction involving two concentric helical springs, the windings of which are of opposite hands so that the outer spring expands while the inner spring contracts. The inner spring is embraced by a slit sleeve which is prestressed inwardly — so that the arrangement is similar to that shown in FIG. 5— whereas the outer spring embraces a slit sleeve which is prestressed outwardly. This construction, in which three chambers are formed, may be highly advantageous in the case of spring joints, because each spring only has to perform half the angular movement and can thus be made shorter. The illustrated leaf springs can be replaced by springs formed from wire of circular or profiled cross-section and the springs can also be connected in parallel, so that the force of both springs is utilised to best advantage.

Figure 6:
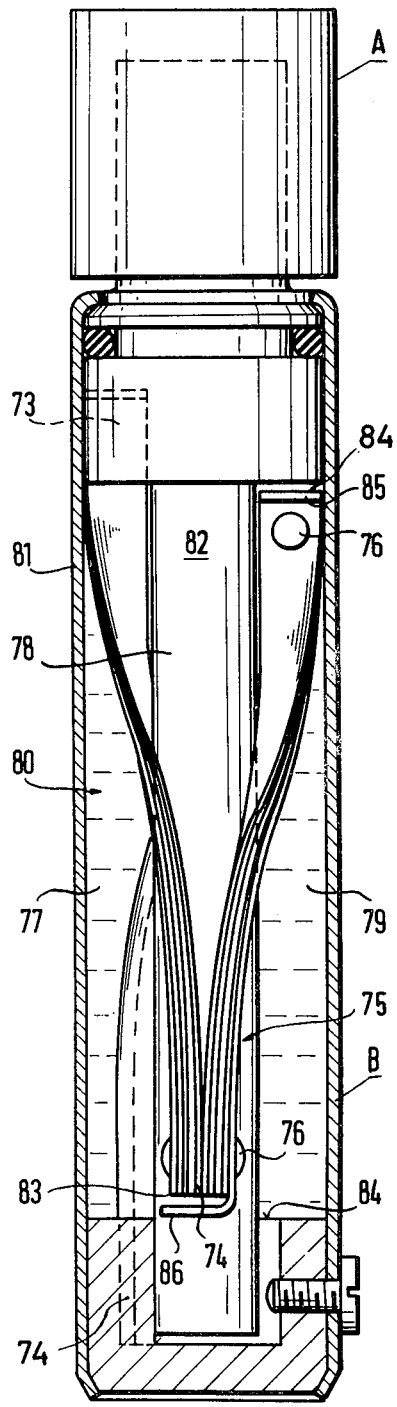
FIG. 6 shows a hinge with a torsion spring drive, with which a number of portions are arranged zigzag fashion around a central shaft in order to prolong the torsion spring.
Figure 7:
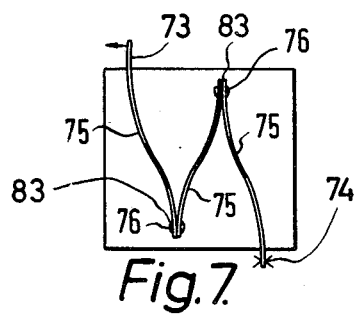
FIG. 7 is a developed diagram of the torsion spring according to FIG. 6.

FIGS. 6 and 7 show an embodiment in which the ends 73 and 74 of a spring element consisting of three torsion bar springs 75 interconnected zigzag-fashion are clamped in such a way that they can be twisted between a hinge part A and a hinge part B. The portions of spring material forming the torsion springs 75 are interconnected by rivets 76 and, when the part A rotates relative to part B, the springs twist helically about a shaft 82 non-rotatably connected to the part A and form hydraulic working chambers 77, 78 and 79 in a cavity 80 within a housing 81 connected with the hinge part B. This arrangement enables substantial lengths of spring material to be accommodated in a short housing 81 and a correspondingly high spring force to be obtained. The upper ends 85 and the lower ends 83 of the torsion spring elements 75 define with the end surfaces 84 of the housing 81 a number of throttled or restricted openings which increase or decrease in size as relative rotation of the two hinge parts takes place. These openings can be closed by valve members constituted by end portions 86 of spring elements 75. The advantage of this embodiment of the invention resides in the facts that large, variable working chambers are obtained with ample working surfaces for the hydraulic fluid, and that high spring forces may be employed with a housing of moderate dimensions.

Figure 8:
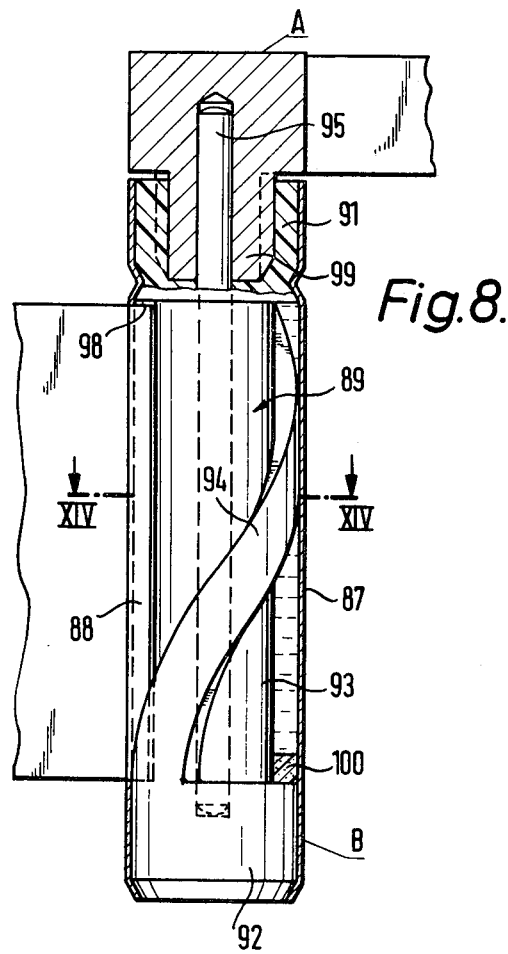
FIG. 8 shows a hinge with a torsion rod drive and damping system obtained by the helical deformation of a radial bar.
Figure 9:
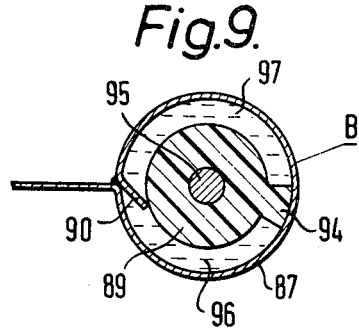
FIG. 9 is a section along the line XIV—XIV of FIG. 8.

A particularly advantageous embodiment of the invention is shown in FIGS. 8 and 9. In this case, the hinge part B includes a housing 87 accommodating a torsion bar 89 which has been injection moulded from a highly elastic, plastics material such as polyurethane, and forms part of the main hinge part A. The housing 87 is formed from a length of sheet metal 88 which has been wound into a cylinder and welded at the meeting edges. The end portion 90 of the length of sheet metal is bent inwards and forms a flap valve which bears against the torsion bar 89. The torsion bar has an enlarged end portion 92 which fits tightly into the housing 87 so that it cannot rotate in relation thereto. The other end 91 is also enlarged but is rotatable within the housing, and between its two ends 91 and 92, the torsion bar 89 includes a portion of smaller diameter along which is formed a radially projecting rib 94 which is approximately parallel to the valve flap 90 and rests against the internal wall of the housing 87. The torsion bar 89 is non-rotatably connected with the main hinge part A via an axle journal 99, so that on rotation of the two hinge parts, twisting takes place in the zone of the section 89/93, and the rib 94 undergoes helical deformation. As a result, the working fluid is pressed out of a chamber 96 into a chamber 97 by way of the flap which is able to lift. After the cessation of the force producing relative rotation, the torsion bar 89 tends to relax, and the rib 94 attempts to resume its original shape, and fluid is forced back from the chamber 97 into the chamber 96 through throttled openings 98 at the end of the narrowed torsion bar part. A rod 95, free to rotate relative to both hinge parts, may serve solely to take up axial forces. The housing 87, like the torsion bar 89 and the remaining hinge parts, is an inexpensive component easy to produce. A gas spring 100, consisting of foamed elastomers, is preferably provided in the chamber and decreases in size during the clamping stroke. The said gas spring, assisted by a certain intrinsic elasticity of the housing 87, not only makes it possible to introduce the working fluid under pressure but also provides a means of compensating any changes in volume resulting from temperature influences, in addition to serving as an overload safety device.

Figure 10:
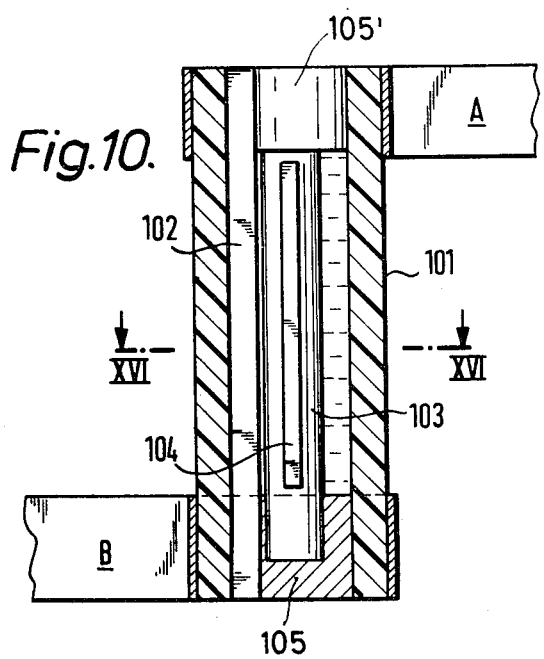
FIG. 10 shows a spring joint as an additional door closing element capable of being built on, with a torsion spring serving as a housing.
Figure 11:
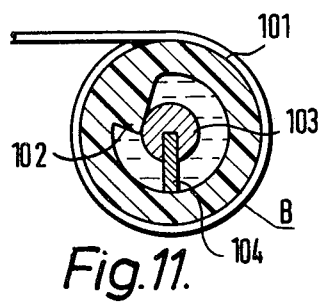
FIG. 11 is a section in the plane XVI—XVI of FIG. 10.

The embodiment of the invention shown in FIGS. 10 and 11 includes a tubular torsion spring which forms a housing 101 whose ends are connected non-rotatably with the parts A and B so that they cannot rotate in relation thereto. The torsion spring is formed from a piece of flexible tubing having a bar 102 which extends at least a part of the entire length of the housing and is directed inwards. The bar 102 preferably rests tangentially against a shaft 103 which is non-rotatably connected with one of the hinge parts A and B and has a rib 104 projecting axially therefrom. The housing 101 is hermetically sealed at both ends by plugs 105, 105', the shaft 103 being advantageously connected with the plug 105' associated with the hinge part A. If the hinge part A rotates in relation to the hinge part B, the housing 101 is twisted about its longitudinal axis. The bar 102 is deformed helically and causes the volume of the chamber situated between it and the bar 104 to vary. Transfer and re-transfer of fluid takes place as described in connection with FIGS. 6 to 8.

Figure 12:
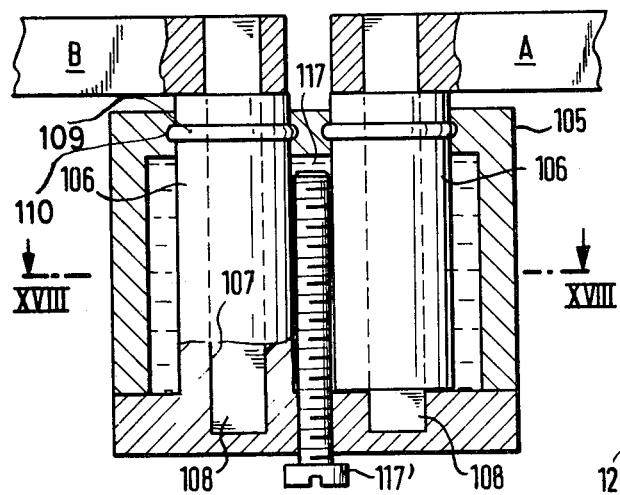
FIG. 12 shows a spring joint with two parallel torsion shafts.
Figure 14:
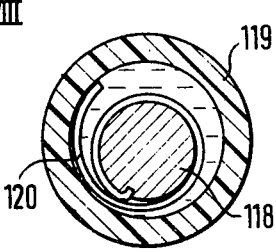
FIG. 14 is a sectional diagram of any desired type of hinge, with an eccentric shaft.
Figure 13:
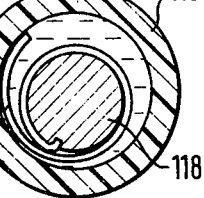
FIG. 13 is a section along the line XVIII—XVIII of FIG. 12.

It is often desirable to provide a unit of this kind which is shorter axially. In these circumstances, the embodiment shown in FIGS. 12 to 14 is particularly suitable. Here, a housing 105 has two tubular torsion bars 106 secured to it at one end, while the main hinge parts A and B are non-rotatably secured to the bars at their other ends. If large forces are required, springs 108 formed into stacks of square cross section, for example, can be contained in axial borings 107 through the torsion bars. In addition to increasing the spring force, the stacks of leaf springs also facilitate attachment to the main hinge parts A and B.

The torsion bars can be provided with sealing beads 109 received within complementary grooves in the housing. The torsion bars 106 can also have axially extending sealing lips 111 for contact with an axially extending lobe formed in the housing 105, so that two interconnected annular chambers 112 and 113 are subdivided into three separate compartments. During relative rotation of the hinge parts A and B, the torsion bars 106 are twisted, as a result of which the lips 111 are deformed helically and the middle compartment 115 is enlarged when the torsion bars relax. Following the cessation of the force producing relative rotation of the hinge parts, the fluid which had entered the compartment 115 is expelled by way of a throttled opening 117, the size of which is adjustable by screw 117'. The escape of fluid along the lengths of the torsion bars is prevented by sealing lips 116 provided in the housing. The housing 105 may be formed from the same material as the torsion springs and indeed may be integral therewith. In this case, a cover can be pressed into the housing and may consist of the same material or possibly a harder material. The torsion springs enable extremely high forces to be applied, so that the entire hydraulically damped spring unit can be made comparatively small. As is evident from the embodiment shown in FIGS. 14, the foregoing principle can also be applied in conjunction with an eccentric pump principle, in which case the shaft 118 or the housing 119 can be constructed as a torsion spring and a leaf spring element 120 as a packing washer.

Figure 15:
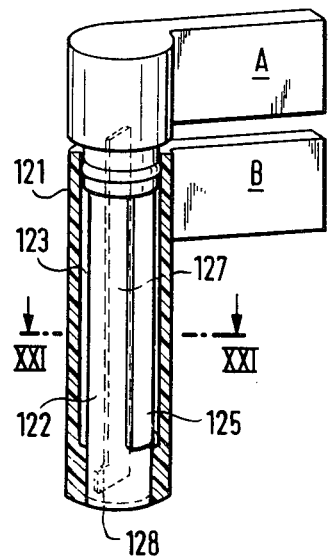
FIG. 15 shows a hinge almost completely of plastic, with injection-moulded torsion housing and shaft-part.
Figure 17:
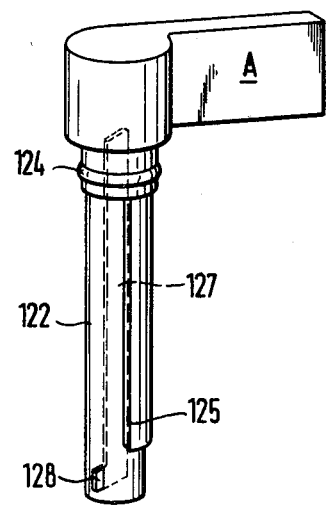
FIG. 17 shows the shaft-part of FIG. 15.
Figure 16:
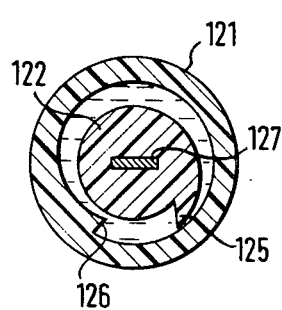
FIG. 16 is a section along the line XXI—XXI of FIG. 15.

A version preferred for mass production, particularly of small hinges, is shown in FIGS. 15 to 17. In this case the complete hinge, including the hinge leaves, is produced by the injection-moulding process. A tubular housing 121 forming a torsion spring is connected to the main hinge leaf B. A shaft 122, which is capable of twisting and which is received within the housing 121, is connected to the hinge leaf A. An annular working chamber 123 between the inner surface of the housing wall and the shaft 122 is sealed at the bottom by virtue of the fact that the lower end of the shaft 122 is secured, for example by adhesive, to the end of the housing. The annular chamber 123 is sealed off at the top by an enlarged shaft portion provided with a sealing bead 124. A sealing lip 125 extends axially along the shaft, while the inner surface of the housing is formed with a step 126 which projects radially inwards and which extends at least over the twistable portion of the housing 121. The twistable shaft 122 can be reinforced by a steel torsion spring 127 provided at its centre and having a lug 128 which engages the housing and serves as an additional means of ensuring that the shaft cannot rotate (other than by twisting) in the housing. This embodiment functions as previously described. Since, however, both the housing and the shaft are twistable a shorter over-all length may be adopted for the hinge parts.

Figure 18:
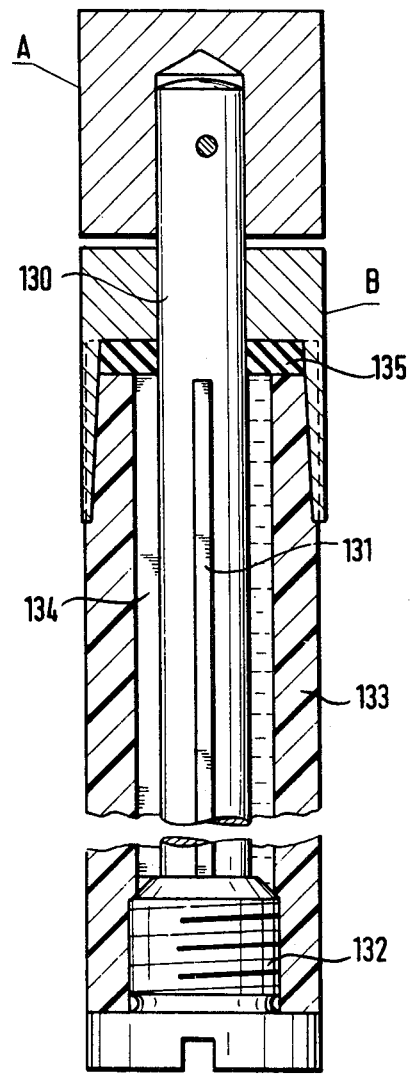
FIG. 18 is a section through a hinge with a torsion spring housing, as a door hinge with a rigid shaft.

Needless to say, the constructional principles described in the foregoing can be varied in numerous ways without departing from the spirit and scope of the invention. In particular, as an alternative to the version shown in FIGS. 18, it is possible for a rigid shaft 130, non-rotatably connected with one hinge part A, to be provided with a radial sealing rib 131 and with an enlarged end portion 132. Accordingly, the part B has a tubular twistable housing 133 to the lower end of which an enlarged part 132 of the shaft 130 is secured screwably, as shown, or alternatively by adhesive. The tubular twistable housing 133 is preferably provided with a radially inwardly projecting sealing rib 134 which, together with the radial sealing rib 131 of the shaft 130, subdivides the annular space between the wall of the housing 133 and the shaft 130 into two separate annular chambers. The twistable housing 133 is non-rotatably connected with one hinge leaf and an additional, preferably compressible, packing device 135 can be interposed and may consist of foamed elastic plastics.

The fluid used within the device may be rheopectic fluid which is formed in-situ in the chambers from components which can be readily filled into the chambers in order to avoid the problems of introducing a highly viscous rheopectic material. Thus, for example, a silicon fluid such as Wacker-Chemie VP 3492 may be mixed with 5 to 6% by volume of hardening fluid such as Wacker-Chemie VP 3493 so that the fluid sets with a time lag from a thinly liquid non-rheopectic state to a highly viscous rheopectic material.

The filling of the fluid into the chambers in a low viscosity liquid state facilitates the mechanisation of the production process and enables the chambers to be filled in a manner such that they remain largely free of air bubbles.

If the rheopectic fluid is forced through constricted openings or gaps its viscosity increases as a function of the speed, in that rapid and slow closing movements of a hinge lead to high and low resistances respectively.

The ability of the fluid to become almost completely set when pressure peaks occur also prevents it from emerging at leaky points, so that the pressure chambers can be rendered reliably hermetic by simple means, e.g. by the adoption of only a small number of screw threads etc. If a pressure rise occurs, moreover, it rapidly decreases, as a flow always takes place through the constricted openings, which are designed to very wide tolerances. The high viscosity, in its turn, enables a space-saving design to be adopted, because only small quantities of fluid are required. The possibility of modifying the volume of at least one working chamber elastically with an air spring such as a foamed elastomer enables pressure peaks to be absorbed without overstraining mechanical components and serves to balance out changes which are caused by temperature, for example, in the volume of the working fluid, and also enables the fluid to be left at a desired prestressing pressure.

In addition to the spiral, helical and torsion bar springs, describied, the spring element used may with great advantage consist of an insert of thermoplastic elastomer plastic, clamped between radial bars of the shaft and housing, in such a way as to undergo deformation in the peripheral direction. This spring may consist of non-compressible material but have cavities through which working fluid can pass or forms such cavities in conjunction with the walls of the housing. The cavities then form part of a working chamber of a hydraulic movement damping system of the kind already described.

One or both ends of the torsion bar may be provided with attachmements shaped as annular sectors, which can thus also serve to subdivide the annular chamber within the hydraulic working chamber. This subdivision, however, is elastic, and the said sectorial attachment can be so shaped as to provide wide flow gaps in one direction of rotation but narrow flow gaps in the other. For if a door or flap is closed rapidly, sufficient elasticity must be provided to ensure that these forces are distributed.

As already mentioned, use may be made of two torsion rods which, according to a further characteristic of the invention can quite easily be made concentric with each other and formed, for example, of simple extruded tube pieces of tubing, for preference interconnected at one end, their other ends being connected with appropriate main hinge parts, the hydraulic damping taking place inside a separate chamber connected thereto.

Of course, it is not essential for one of the parts to be physically connected to the door, provided it can bear on the door.

The invention thus provides a means of applying hydraulic damping devices to simple mass-produced articles of which the manufacturing accuracy, for operational reasons, cannot exceed a certain level. The invention enables such mass-produced articles to perform functions of which they would formerly have been quite incapable. By virtue of the invention, door closing elements need no longer be inaesthetic in appearance, and may look like ordinary hinges and, if necessary, also function as such. The restoring forces, hitherto only obtainable with helical springs of very large size, can now be obtained with torsion bars of comparatively moderate diameter likewise. The invention is nevertheless not confined to certain dimensions. Hinges according to the invention can also be made to very small dimensions, and as they are simple mass-produced components they may also be made up of a small number of moulded parts, or injection mouldings may be combined with metal parts. The invention is therefore also suitable for furniture hinges of all kinds.

I claim:

1. A device for applying spring force to, and damping movement of, a movable structure such as a door relative to a stationary structure such as a door frame, said device comprising first and second parts for attachment to the movable and stationary structures respectively; one of said parts including a housing and the other part including a member supported by the housing for rotation relative thereto; the housing have therein two working chambers which contain a damping fluid and intercommunicate by way of a constricted opening, the relative volumes of the working chambers varying as the member rotates relative to the housing, and a spring interconnecting the housing and the member and biasing the member in a pre-determined rotational direction relative to the housing; distortion of the spring during relative rotation of the member and housing serving to produce the variation in the relative volumes of said chambers.

2. A device as claimed in claim 1, wherein the housing has therein a cavity within which the spring is disposed, the spring being immersed in the damping fluid and constituting a partition between the two working chambers, said chambers being formed by parts of the cavity.

3. A device as claimed in claim 1, wherein the housing has therein a cavity and the member comprises a shaft disposed within the cavity, and the spring is a torsion spring extending axially through the shaft.

4. A device as claimed in claim 2, wherein a portion of the spring is formed as a movable valve member controlling the flow of fluid through the constricted opening, fluid being capable of flowing past said valve member in two directions.

5. A device as claimed in claim 2, wherein one portion of the spring forms one side of the constricted opening through which fluid may flow from one working chamber to the other and another portion of the spring forms one side of a second constricted opening through which fluid may return to said one working chamber.

6. A device for applying spring force to, and damping movement of, a movable structure such as a door relative to a stationary structure such as a door frame, comprising a housing defining a cavity containing a damping fluid, a shaft disposed within the cavity, means connected with the housing for attachment to one of the structures, means connected with the shaft for attachment to the other of the structures, a spiral spring disposed in the cavity, and immersed in the damping fluid, said spring surrounding the shaft and defining with portions of the shaft and the housing a spiral space, an end portion of the spring forming a flap valve dividing the spiral space into two chambers, the spring being connected to the shaft and the housing so that relative rotation between said shaft and housing distorts the spring which varies the relative volumes of said chambers.

7. A device as claimed in claim 6, wherein the flap valve permits flow of damping fluid therepast at a first rate from one chamber to the other and at a second rate in the other direction.

8. A device for applying spring force to, and damping movement of, a movable structure such as a door relative to a stationary such as a door frames, comprising a housing defining a cavity containing a damping fluid, a helical spring disposed in the cavity, a rotary member connected to one end of the spring, the other end of the spring being anchored to an end portion of the housing, so that relative rotation of the housing and member reaults in a change in diameter of the spring, a slit sleeve embracing the spring, the sleeve being prestressed in the radially inwards direction, the slit in the sleeve defining a non-return valve permitting flow of damping fluid in the outward direction, at least one end of the sleeve being narrowly spaced from the housing and defining therewith a constricted opening through which damping fluid may flow in the opposite direction.

9. A device for applying spring force to, and damping movement of, a movable structure such as a door relative to a stationary structure such as a door frame, comprising a housing adapted to be attached to one of the structures, the housing having therein a cavity, said cavity containing a damping fluid, a torsion bar disposed within the cavity, one end of the torsion bar being anchored to the housing, the other end of the torsion bar being adapted for attachment to the other structure, the torsion bar having a rib extending therealong, a flap valve in the cavity, the flap valve and the rib dividing the cavity into two chambers, twisting of the torsion bar upon relative rotation of the two structures causing the rib to vary the relative volumes of the chambers.

10. A device as claimed in claim 9, wherein the housing is formed from a sheet of material rolled into cylindrical form, and the flap valve is formed by an end portion of the sheet.

11. A device for applying spring force to, and damping movement of, a movable structure such as a door relative to a stationary structure such as a door frame, comprising a housing defining a cavity containing a damping fluid, a shaft disposed within the cavity, means connected with the housing for attachment to one of said structures, means connected with the shaft for attachment to the other of the structures, means on one of the housing and shaft cooperating with portions of the housing and shaft to divide the cavity into two working chambers intercommunicating by way of a constricted opening, the housing being of spring material and deforming to vary the relative volumes of the chambers as relative rotation takes place between the shaft and housing.

* * * * *